United States Patent
Chen et al.

(10) Patent No.: US 6,799,152 B1
(45) Date of Patent: Sep. 28, 2004

(54) CRITICAL DIMENSION STATISTICAL PROCESS CONTROL IN SEMICONDUCTOR FABRICATION

(75) Inventors: Chih-Ping Chen, Hsinchu (TW);
Shao-Chung Hsu, Hsinchu (TW);
De-Chuan Liu, Hsinchu (TW);
Jung-Kuei Lu, Hsinchu (TW);
Cheng-Yi Lin, Taichung (TW);
Ta-Hung Yang, Hsinchu (TW);
Hsin-Cheng Liu, Hsinchu (TW);
Mao-I Ting, Hsinchu (TW);
Yih-Cheng Shih, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 172 days.

(21) Appl. No.: 10/206,268

(22) Filed: Jul. 26, 2002

(51) Int. Cl.[7] .............................................. G06F 17/50
(52) U.S. Cl. .............................. 703/14; 703/22; 716/2; 716/5; 700/109
(58) Field of Search ......................... 703/14, 22; 716/2, 716/5; 700/109

(56) References Cited

U.S. PATENT DOCUMENTS 5,956,251 A * 9/1999 Atkinson et al. ........... 700/109

6,721,676 B1 * 4/2004 Ueda ........................... 702/123

OTHER PUBLICATIONS

Randles et al., "Introduction to The Theory of Nonparametric Statistics", (Date/Publisher unknown) pp. 395–397.

* cited by examiner

Primary Examiner—Stacy A. Whitmore
(74) Attorney, Agent, or Firm—Beyer Weaver & Thomas LLP (57) ABSTRACT

The current invention provides a method for analyzing process variations that occur during integrated circuit fabrication. Critical dimension data is collected for each layer of the integrated circuit fabrication process for a period of time and a shift indicator that indicates variation in the critical dimension data for each layer of the integrated circuit fabrication process is calculated. A machine drift significance indicator is also calculated for each machine used in each layer of the integrated circuit fabrication process, and a maximum shift of mean value for each layer of the integrated circuit fabrication process is defined. The shift indicator, the maximum shift of mean value and the machine drift significance indicator are used to determine at least one likely cause of variation in critical dimension for each layer of the integrated circuit fabrication process.

26 Claims, 4 Drawing Sheets

CRITICAL DIMENSION STATISTICAL PROCESS CONTROL IN SEMICONDUCTOR FABRICATION

FIELD OF THE INVENTION

This invention relates to methods for analyzing process variations that occur during an integrated circuit fabrication process. More specifically the invention relates to statistical process control methods for identifying and correcting critical dimension variation of an integrated circuit fabrication process.

BACKGROUND OF THE INVENTION

Statistical process control is the application of statistical methods to the measurement and analysis of variations in a process. A process can be defined as the organization of individuals, machines, materials and methods that produces a specified product. Statistical process control can provide information on whether variations in a process product are within the specification limits of the process. Thus, statistical process control provides information about process quality and may explain the cause(s) of poor process performance.

Statistical process control analysis is a useful tool in integrated circuit fabrication, where rigorous control of process quality is necessary. Statistical process control has become critical to the success of integrated circuit fabrication processes as device sizes reach 0.35 μm or less. Process engineers routinely use real time statistical process control to monitor key parameters that affect integrated circuit fabrication process quality.

Controlling variation in critical dimension of integrated circuit features during integrated circuit fabrication processes is critical in the competitive integrated circuit industry. Particularly important is determining whether variation in critical dimension of an integrated circuit fabrication process is caused by machine variation or process variation.

Statistical process control trend charts have been used to analyze the cause of critical dimension variation during integrated circuit fabrication. Comparing the trend charts of different processes and machines used in the integrated circuit fabrication process provides useful information about process quality, but requires significant time and effort to identify and characterize critical dimension variation. Statistical process control chart analysis requires constant collection and analysis of large amounts of experimental data. Thus, statistical process control chart analysis is labor intensive, which wastes skilled engineering resources that could be more efficiently deployed in solving fundamental process problems.

Therefore, there is a continuing need for improved statistical process control methodologies that rapidly and efficiently identify causes of critical dimension variation in an integrated circuit fabrication process. Furthermore, such methods preferably have a relatively high degree of automation to conserve expensive engineering resources.

SUMMARY OF THE INVENTION

The present invention relates generally to statistical process control methods that may efficiently identify the likely cause of critical dimension variation during integrated circuit fabrication. The described methods are easily implemented and allow for rapid identification of the likely cause of critical dimension variation, thus increasing the efficiency while reducing the cost of integrated circuit fabrication.

In one aspect, the current invention provides a method for analyzing process variations that occur during integrated circuit fabrication. Critical dimension data is collected for each layer of an integrated circuit fabrication process for a period of time. A shift indicator that indicates variation in the critical dimension data for each layer of the integrated circuit fabrication process is calculated using the collected critical dimension data. A machine drift significance indicator is also calculated for each machine used in each layer of the integrated circuit fabrication process and a maximum shift of mean value for each layer of the integrated circuit fabrication process is defined. The shift indicator, the maximum shift of mean value and the machine drift significance indicator are used to determine at least one likely cause of variations in critical dimensions for each layer of the integrated circuit fabrication process.

In one embodiment, the maximum shift of mean value is a function of a defined acceptable value of the shift indicator. In a more specific embodiment, the maximum shift of mean value is defined by the following formula: maximum shift of mean value=½ specification of the process−(target Cpk*3 standard deviation). In one embodiment, the shift indicator is Cpk. In a more specific embodiment, Cpk is defined by the following formula: Cpk=(½ specification of the process−mean value shift)/3 standard deviation. In one embodiment, the machine drift significance indicator is $P_0$. In a more specific embodiment, $P_0$ is defined by the following formula:

$$P_0 = \text{Probability}\left[x^2_{k-1} = \frac{H}{1 - \sum_{j=1}^{t} q_j(q_j^2 - 1)/n(n^2 - 1)}\right]$$

In another aspect, the present invention provides a method for analyzing process variations that occur during integrated circuit fabrication. Critical dimension data for each layer of the integrated circuit fabrication process is collected for a period of time. If a calculated shift indicator is less than a predetermined first threshold value, likely causes of critical dimension variations are identified at least in part based on the machine drift significance indicator for particular machines. The machine drift significance indicator are calculated for each machine used in each layer of the integrated circuit fabrication process.

In some embodiments, when the machine drift significance indicator is greater than a predetermined threshold value, the likely cause of critical dimension variations is further based at least in part on the maximum shift in mean values.

BRIEF DESCRIPTION OF THE DRAWINGS

The invention may best be understood by reference to the following description taken in conjunction with the accompanying drawings in which.

DETAILED DESCRIPTION OF THE PREFERRED EMBODIMENTS

Reference will now be made in detail to a preferred embodiment of the invention. An example of a preferred embodiment is illustrated in the accompanying drawings. While the invention will be described in conjunction with a preferred embodiment, it will be understood that it is not intended to limit the invention to a preferred embodiment. To the contrary, it is intended to cover alternatives, modifications, and equivalents as may be included within the spirit and scope of the invention as defined by the appended claims.

Figure 1:
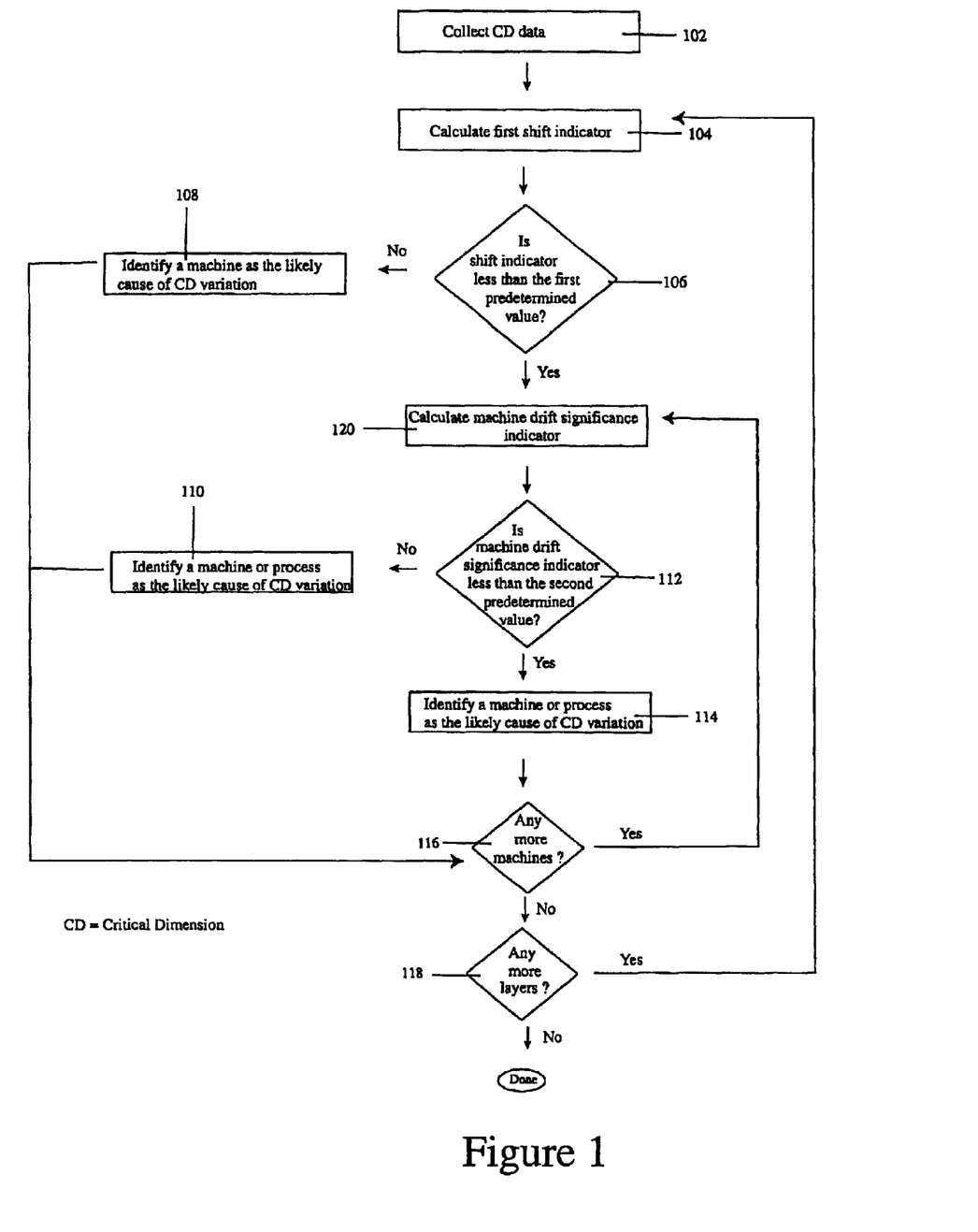
FIG. 1 is a flowchart that illustrates a method for analyzing variation in critical dimension of an integrated circuit fabrication process.

FIG. 1 is a flowchart that illustrates a method for analyzing critical dimension variation in an integrated circuit fabrication process. The analysis may provide information that determines whether critical dimension variations are caused by machine variation or process variation. FIG. 1 presents an overview of some important computational processes that may be used in the instant invention.

Initially critical dimension data is collected for each layer/product of an integrated circuit fabrication process for a period of time (step 102). A layer of an integrated circuit fabrication process is, for example, a polysilicon layer, a gate oxide layer, an isolation dielectric layer or a metal layer. It should be noted that the current invention is not restricted to the layers mentioned above and can be used to analyze critical dimension variation of any layer that may be used in integrated circuit fabrication. The critical dimension of certain layers may vary more than other layers. For example, the critical dimension of metal layers typically vary more than the critical dimension of polysilicon layers.

Typically, critical dimension data is collected for a period of time long enough to document routine critical dimension variation for each layer of the integrated circuit fabrication process. Thus, the period of time critical dimension data is collected may vary depending on the exact details of the particular integrated circuit fabrication process. Although the period over which critical dimension data is collected may vary significantly, generally it is most useful when gathered over an extended period, as for example, one month.

After critical dimension data has been collected for a period of time, a shift indicator that is a measure of variation in the critical dimension data is calculated at 104 for each layer/product of the integrated circuit fabrication process. The shift indicator may also be calculated for the overall integrated circuit fabrication process. In one particular embodiment, the shift indicator is Cpk. Cpk is based on the concepts of mean value and standard deviation and is a measure of whether the critical dimension variation of each layer of an integrated circuit made by a particular integrated circuit fabrication process is acceptable. Thus, Cpk may indicate deviation from a targeted critical dimension. Cpk may be affected by integrated circuit fabrication processes such as coating, stepping, developing, photolithography, etching, SEM etc.

In the described embodiment, Cpk may be calculated by the following formula: Cpk=(½ specification−mean value shift)/3 standard deviation. Specification=USL−LSL where USL is the upper specification limit, while LSL is the lower specification limit of the process. The specification of a particular process is usually determined when the process is released and is thus a constant. Mean value shift may be calculated by the following formula: mean value shift= |mean value−target value|. Mean value is the actual mean value of the collected critical dimension data while the target value is the desired mean value of the critical dimension data Thus, mean value shift indicates the amount the mean value of the critical dimension data deviates from a target mean value for a particular layer and is a measure of machine drift contribution to Cpk. The standard deviation is the estimated standard deviation of the processes used to form the layer and indicates the contribution of process problems to Cpk.

At 106 the shift indicator of a particular layer is compared with a first predetermined threshold value. In one embodiment, a calculated Cpk for a layer is compared with a target Cpk for that layer. The target Cpk, which may be the first predetermined threshold value, is usually indicative of the required precision of a particular integrated circuit fabrication process. For example, an acceptable Cpk for a 1.0 μm integrated circuit may be considerably lower than a corresponding Cpk for a 0.35 μm integrated circuit. Generally, the target Cpk is left to the discretion of the user. By way of example, a representative target Cpk for a 0.4 μm integrated circuit is in the range of about 1.0 to 1.33. In the exemplary embodiment, which is directed at 0.4 μm technology, the target Cpk is about 1.33. Generally, Cpk may vary with the process variation, while target Cpk may vary by technology.

Generally, a low Cpk value for a layer signifies a large amount of critical dimension variation in the layer. In some situations, the Cpk values of different layers may be compared to determine which layer should be first studied for critical dimension variation. For example, the critical dimension variation in layers with a calculated Cpk of less than about 1.33 may be determined prior to the critical dimension variation in layers with a calculated Cpk between about 1.33 and about 1.5.

If the shift indicator is less than the first predetermined threshold value, a machine drift significance indicator may be calculated at 120. In the described embodiment, the machine drift significance indicator is calculated at 120 when Cpk is less than about 1.33. When the shift indicator is greater than the first predetermined threshold value a machine may be identified as a likely cause of critical dimension variation at 108 which will be described later.

Calculating Cpk is insufficient to identify the cause of critical dimension variation for a layer. The equation for Cpk reveals that minimization of standard deviation and the mean value shift will result in less critical dimension variation. The machine drift significance indicator calculated at 120 clarifies whether the critical dimension variation is caused by machine variation or process variation. In one embodiment, the machine drift significance indicator is $P_0$, which is typically calculated for every machine used in the integrated circuit fabrication process. Thus, $P_0$ may be calculated for a SEM machine, a coating machine, a stepper machine, a photolithography machine, a developing machine, an etching machine etc.

$P_0$ is a statistical definition from the method of hypotheses testing (J. J. Devore, *Probability and Statistics for Engineering and the Sciences,* Brooke/Cole, Third Edition, which is incorporated herein by reference in its entirety). The null hypothesis, the alternative hypothesis and type-1 error are integral to the method of hypotheses testing. The null hypothesis ($H_0$) assumes that similar machines behave identically. Thus, for example, all etch machines are assumed to have identical critical dimension variation. The alternative hypothesis ($H_a$) assumes that at least one machine behaves differently than other machines. For example, at least one etch machine may have a different critical dimension variation than the other etch machines. A type-1 error is rejecting $H_0$ when $H_0$ is true. Thus, in order to prove $H_a$ the probability of a type-1 error should be minimal. The critical dimension variation is indicative of machine drift when $H_0$ is false (i.e. the probability of a type 1 error is small). $P_0$ is the probability that at least one machine has a different critical dimension variation from the other machines when there is actually no difference in critical dimension variation between machines.

A non-parametric procedure may be used to calculate $P_0$ (R. H. Randle, D. A. Wolf, *Introduction to the Theory of nonparametric Statistics,* John Wiley). $P_0$ can be calculated by the following formula:

$$P_0 = \text{Probability}\left[ x_{k-1}^2 = \frac{H}{1 - \sum_{j=1}^{t} q_j(q_j^2 - 1)/n(n^2 - 1)} \right]$$

When $P_0$ is small a substantial probability exists that critical dimension variation for a layer is due to a defective machine.

At 112 the calculated machine drift significance indicator is compared with a second predetermined threshold value. In the described embodiment, the machine drift indicator is $P_0$. For example, the second predetermined threshold value may be between about 0.05 and about 0.10. More specifically, the second predetermined threshold value may be about 0.05. The second predetermined threshold value is usually representative of the required precision for a particular machine used in an integrated circuit fabrication process. For example, if the second predetermined threshold value is about 0.10, machines with a relatively low level of critical dimension variation from other machines can be identified, which may be important as device size decreases.

When the machine drift significance indicator is less than the second predetermined threshold value a machine or a process may be identified as the likely cause of critical dimension variation at 114. In the exemplary embodiment, a machine or a process may be identified as the likely cause of critical dimension variation at 114 when $P_0$ is less than about 0.05. When the machine drift significance indicator is greater than the second predetermined threshold value a machine or a process may be identified as a likely cause of critical dimension variation at 110 which will be described later.

Only when both the shift indicator is less than the first predetermined threshold value at 106 and the machine drift significance indicator is less than the second predetermined value at 112 may a machine or a process be identified as the likely cause of critical dimension variation at 114. In this situation, the comparison at 106 indicates the critical dimension drift of the layer is unacceptable while the comparison at 112 strongly implies that the critical dimension drift of at least one machine is different than other similar machines. The source of the critical dimension variation may be the process used to form the layer, drift in the machine used to perform the process or a combination of both.

The first two steps of 114 (FIG. 2, 202, 204), 110 (FIG. 3, 302 and 304) and 108 (FIG. 4, 402, 404) are identical. A significant difference at the beginning of 108, 110 and 114 is the information available about the shift indicator and/or machine drift significance indicator which, determines whether an integrated circuit process limitation or machine variation or both are likely causes of critical dimension variation.

Figure 2:
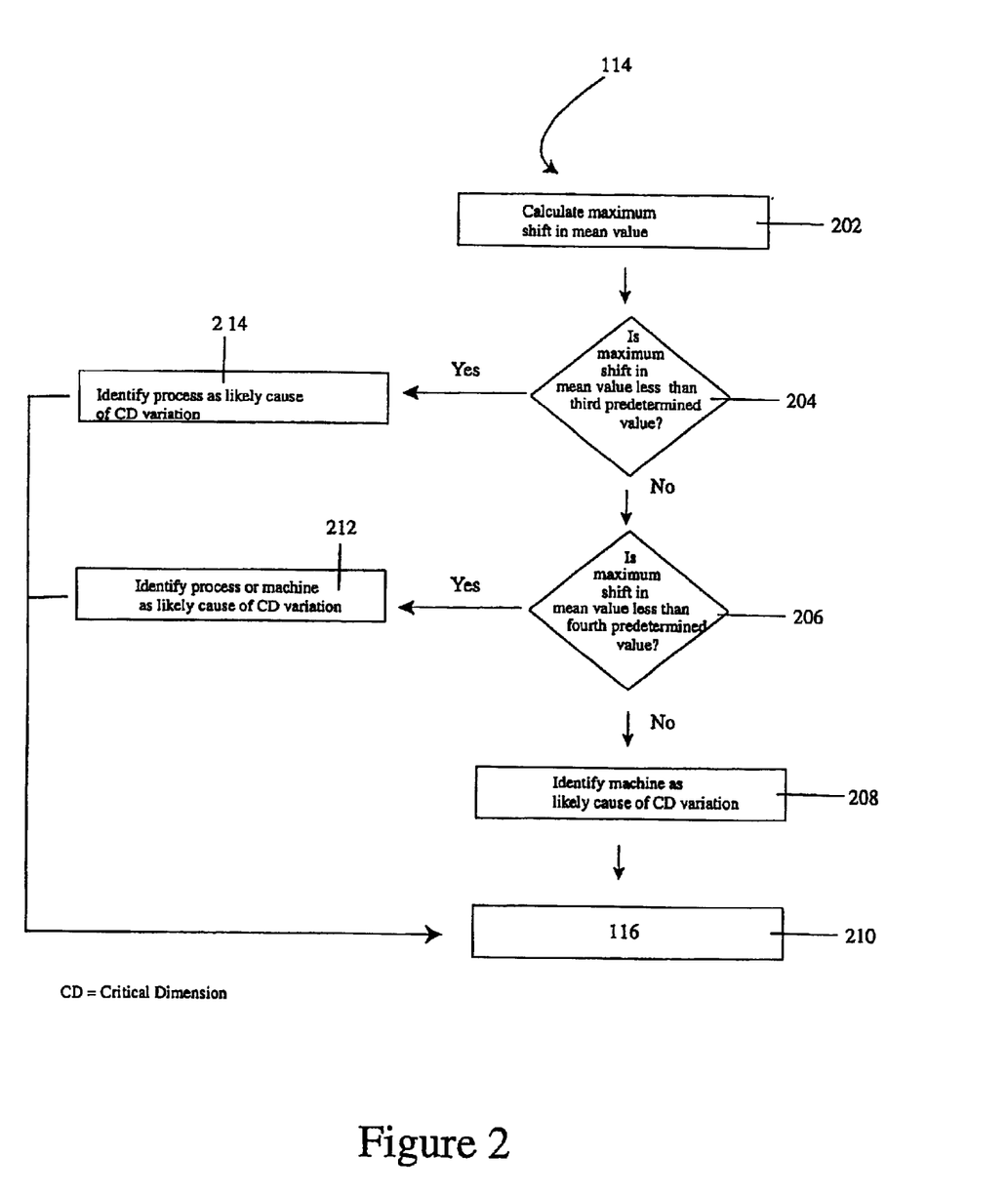
FIG. 2 is a flowchart that illustrates the detailed procedure of step 114 of FIG. 1.

FIG. 2 is a flowchart that illustrates one method suitable for use at 114 to determine whether a machine or a process is the likely cause of critical dimension variation. At 202, in FIG. 2 the maximum shift in mean value is calculated for a machine. In the described embodiment, the maximum shift in mean value is calculated by substituting the first predetermined threshold value into the equation for Cpk and solving for mean shift. Maximum shift in mean value, in this situation, may be represented by the following formula: maximum shift in mean value=($\frac{1}{2}$ Specification−1.33)*3 standard deviation. Note that in this particular embodiment a value of 1.33 has been chosen for the first predetermined threshold value (target Cpk). The target Cpk is left to discretion of the user. Generally the target Cpk may be between about 1.0 and about 1.33 for a 0.4 $\mu$m device technology.

"Specification" usually refers to the specified tolerance of the process. That is, the difference between the upper specification limit (USL) and the lower specification limit (LSL). Mathematically this can be represented by the formula: Specification=USL−LSL. The maximum shift in mean value may distinguish whether the machine variation is caused by mean shift of a machine or by process variations.

At 204 if the calculated maximum shift in mean value is less than the third predetermined value a process may be identified as the likely cause of critical dimension variation at 214. In an exemplary embodiment, the third predetermined value may be about 0 $\mu$m. Thus, in this situation, machine performance is usually satisfactory while the process variations are usually unacceptable.

The process performed by the particular machine should be investigated as one of the cause(s) of critical dimension variation in the layer at 214. Correction of critical dimension variation may entail process recipe optimization and/or fundamental process improvement by process engineers. Usually, the process will not be performed until the critical dimension variation reaches an acceptable value. Note that after 214, machine drift significance indicators for other machines used in the layer may be calculated at 116 of FIG. 1.

Alternatively, when the calculated maximum shift in mean value is greater than the third predetermined threshold value it is compared with a fourth predetermined threshold value at 206. If the calculated maximum shift in mean value is greater than the fourth predetermined value, a machine may be identified as the likely cause of critical dimension variation at 208. For example, the fourth predetermined threshold value may be about 0.02 $\mu$m. Thus, in this situation, machine performance will usually be unsatisfactory while process performance is usually acceptable.

Machines that are identified as the likely cause of critical dimension variation are then investigated, as represented at step 208. As appropriate, the defective machine may be removed from the integrated circuit fabrication process. Note that after 208, machine drift significance indicators for other machines used in the layer may be calculated at 116 of FIG. 1.

If the maximum shift of mean value is greater than the third predetermined threshold value and less than the fourth predetermined threshold value a process or machine is identified as the cause of critical dimension variation at 212. Here, either the process performed by the machine or the machine itself may cause the critical dimension variation in the layer. In the described embodiment, the third predetermined value may be about 0 $\mu$m and the fourth predetermined value may be about 0.02 $\mu$m.

The situation at 212 is usually less definitive than at either 208 or 214 since either the machine or the process or both may be defective. Thus, correction of the problem may entail process recipe optimization, fundamental process improvement by process engineers or machine optimization or replacement. For example, a test run of the photolithography process or machine may be made. In another example, the machine and/or process may not run until the critical dimension variation are within an acceptable range. Note that after 212, machine drift significance indicators for other machines used in the layer may be calculated at 116 of FIG. 1.

Referring now to FIG. 1, when the machine drift significance indicator is greater than the second predetermined value at 112 a process or machine may be identified as the likely cause of critical dimension variation at 110. It should be pointed out that the shift indicator is less than the first predetermined threshold value at 106 for a process or machine to be identified as the likely cause of critical dimension variation at 110. The comparison at 106 indicates the critical dimension variation of the layer is unacceptable while the comparison at 112 strongly implies that the machines are behaving identically. Critical dimension variation will usually be caused by process variation in this situation because the machine drift significance indicator is greater than the second predetermined threshold value at 112.

Figure 3:
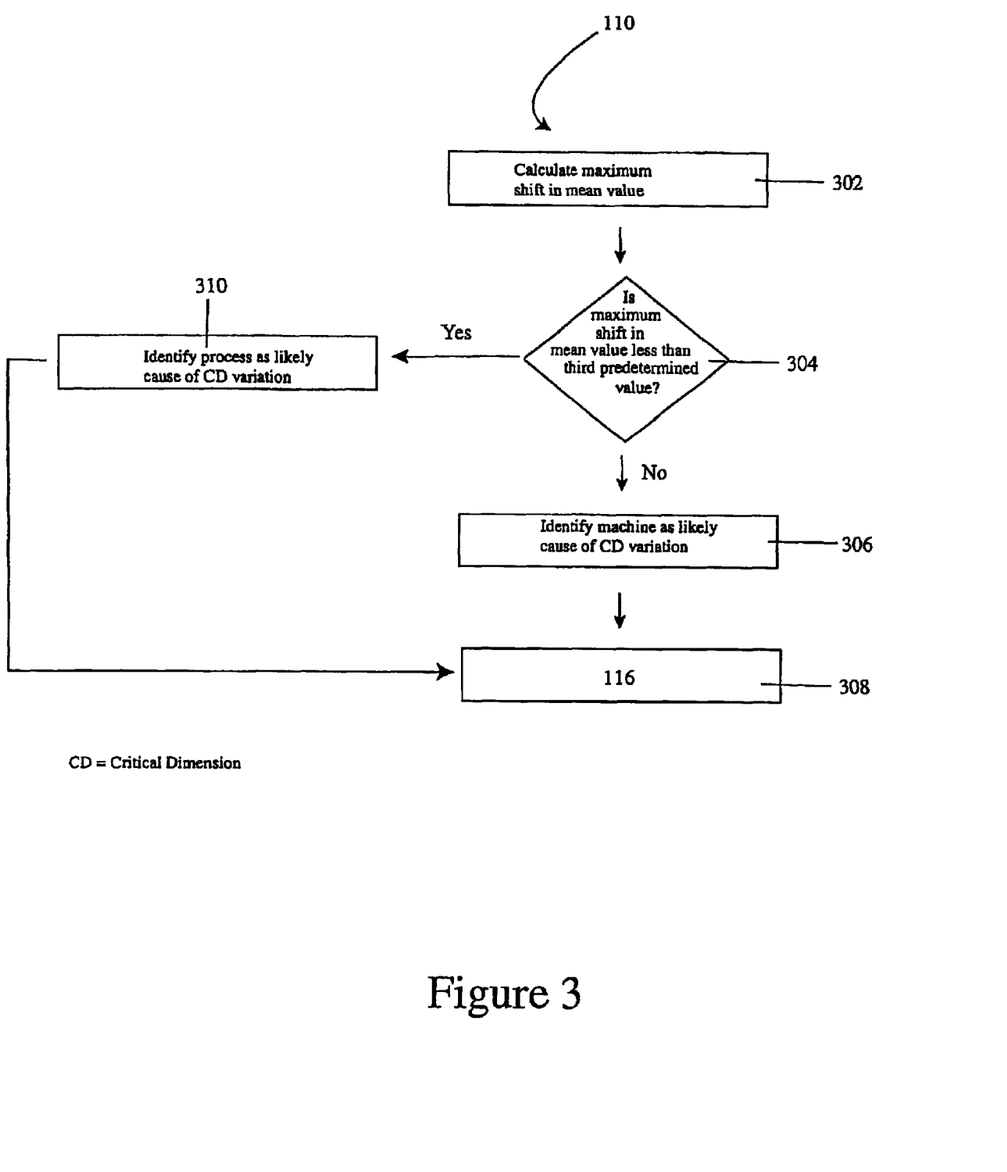
FIG. 3 is a flowchart that illustrates the detailed procedure of step 110 of FIG. 1.

FIG. 3 is a flowchart that illustrates the method used at 110 to determine whether a machine or a process is the likely cause of critical dimension variation. At 302 in FIG. 3 the maximum shift in mean value is calculated for a machine used in forming a particular layer as explained above for 202. Although the likely cause of critical dimension variation is process variation, this calculation serves as a second checkpoint for machine variation.

At 304 the calculated maximum shift in mean value is compared with a third predetermined threshold value. If the calculated maximum shift in mean value is less than the third predetermined threshold value a process may be identified as the likely cause of critical dimension variation. In an exemplary embodiment, the third predetermined value may be about 0.02 $\mu$m. Thus, in this situation, machine performance is usually satisfactory while process performance is unacceptable.

The process performed by the particular machine should be investigated as one of the cause(s) of critical dimension variation in the layer at 310. Correction of critical dimension variation may entail process recipe optimization and/or fundamental process improvement by process engineers. Usually, the process will not be performed until the critical dimension variation reaches an acceptable value. Note that after 310, other machines used in the layer may be identified at 116 of FIG. 1.

Alternatively, if the calculated maximum shift in mean value is greater than the third predetermined threshold value a machine may be identified as a likely cause of critical dimension variation at 306. A described embodiment, the third predetermined value may be about 0.02 $\mu$m. A shift in mean value greater than the third predetermined threshold value usually signifies that the likely cause of critical dimension variation is machine variation. Thus, in this situation, machine performance is usually unsatisfactory while the process performance is usually satisfactory. For example, any defective SEM or etch machine may be removed from the integrated circuit fabrication process. In another example, the focus and energy of the photolithography machine may be adjusted. Note that after 310, other machines used in the layer may be identified at 116 of FIG. 1.

Referring now to FIG. 1, when the shift indicator is greater than the second predetermined value at 106 a machine may be identified as the likely cause of critical dimension variation at 108. The comparison at 106 indicates whether the critical dimension variation of the layer is acceptable. The process of 108 is a second checkpoint for machine variation.

Figure 4:
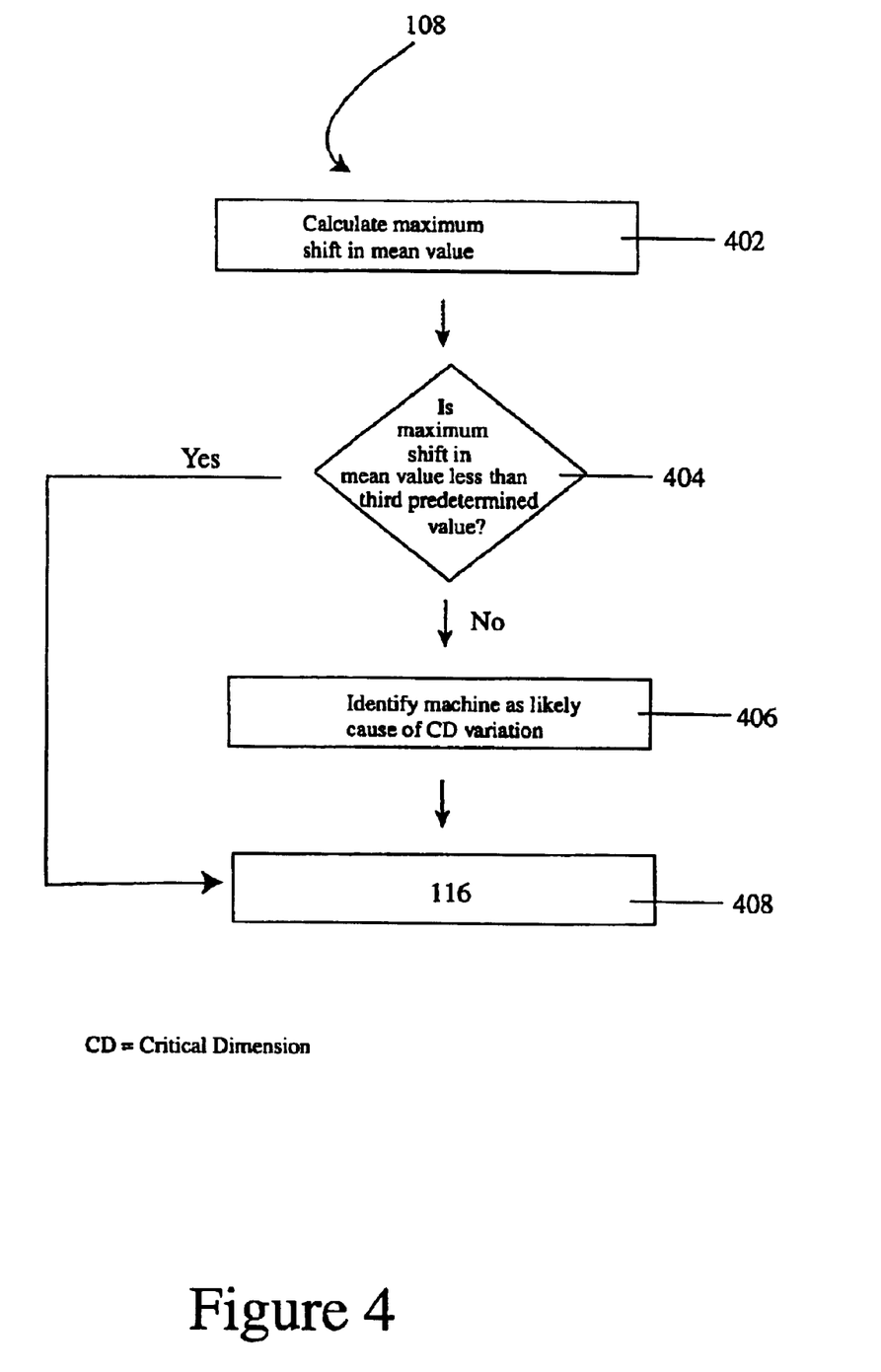
FIG. 4 is a flowchart that illustrates the detailed procedure of step 108 of FIG. 1.

FIG. 4 is a flowchart that illustrates the method used at 108 to determine whether a machine is the likely cause of critical dimension variation. At 402 in FIG. 4 the maximum shift in mean value is calculated for a machine used in forming a particular layer as explained above for 202. Even though the shift indicator calculated at 106 is greater than the first predetermined threshold value (which usually indicates acceptable critical dimension variation) the mean value of the machine may have drifted enough to cause easily correctable critical dimension variation.

At 404 the calculated maximum shift in mean value is compared with a third predetermined threshold value. When the calculated maximum shift in mean value is less than the third predetermined threshold value other machines used in the layer may be identified at 408. For example, the third predetermined value may be about 0.02 $\mu$m. A shift in mean value less than the third predetermined threshold value usually signifies that no significant critical dimension variation has occurred. Thus, in this situation, both machine performance and the process performance are usually satisfactory.

If the calculated maximum shift in mean value is greater than a third predetermined threshold value at 404 a machine may be identified as the likely cause of critical dimension variation at 406. For example, the third predetermined value may be about 0.02 $\mu$m. Thus, in this situation, machine performance will usually be unsatisfactory while the process is usually satisfactory. For example, any defective SEM or etch machine may be removed from the integrated circuit fabrication process. In one embodiment, the focus and energy of the photolithography machine may be adjusted. Note that after 406, other machines used in the layer may be identified at 116 of FIG. 1.

Referring now to FIG. 1, other machines used in the layer may be identified at 116. If another machine has been used to form the layer a machine drift significance indicator may be calculated for the new machine at 120 and the previously described processes of 110, 112, 114 and 116 may be repeated. The loop may continue until a machine drift significance indicator has been calculated for every machine used to form the layer.

Otherwise, at 118 other layers in the integrated circuit fabrication process may be investigated for critical dimension variation. If other layers exist a shift indicator may be calculated for the new layer at 106 and the previously described processes of 108, 120, 110, 112, 114 and 116 may be repeated. Otherwise the process depicted in FIG. 1 has been completed.

The process illustrated in FIG. 1 provides an automated method that rapidly identifies machines with significant critical dimension variation in an integrated fabrication process. Regular monitoring of an integrated circuit fabrication process using the method of the current invention may allow for identification and removal of defective machines before they can adversely impact integrated circuit fabrication and may also indicate which processes need fundamental improvement. The present method, through automated monitoring of critical dimension variation, allows for efficient deployment of valuable engineering resources.

It should be noted that while a computerized process that that closely monitors critical dimension variation of layers in an integrated circuit fabrication process has been described, significant improvement of an integrated circuit fabrication process requires optimization of the shift indicator which may be Cpk. Fundamental process improvement, which reduces the standard deviation of the process, is necessary to optimize Cpk.

Three processes have been identified that are integral to improving Cpk and reducing critical dimension variation. First, focus alignment of the photolithography process has a large impact on the critical dimension variation of a layer. Calibration of different steppers and dynamic focus offset have been found to compensate for machine drift. Similarly exposure energy also has a large effect on the critical dimension variation of a layer. Optimizing these aspects of a photolithography apparatus can significantly reduce the critical dimension variation of a layer. Second, top antireflective coating ("TARC") process improvement reduces resist air reflectivity, thus improving the process. Layer to layer variations can be reduced by about 50% in some layers such as PL4. Finally, lens heating compensation reduces lot to lot variation by calculating a focus model that is affected by heating during exposure. The critical dimension variation of metal layers was reduced to a greater extent than the critical dimension variation of polysilicon layers by lens heating compensation.

Generally, embodiments of the present invention may employ various process steps involving data stored in or transferred through one or more computer systems. Embodiments of the present invention also relate to an apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Although the foregoing invention has been described in some detail to facilitate understanding, it will be apparent that certain changes and modifications may be practiced within the scope of the appended claims. For example, different predetermined threshold values can be used. In some instances alternative methods for calculating the shift indicator, the machine drift significance indicator and the maximum shift of mean value may be implemented. Furthermore, it should be noted that there are alternative ways of implementing the process of the present invention. For example, the steps of the process could be performed in a different order or on different computer systems. The method of the current invention may be applicable to different fabrication processes. Accordingly, the present embodiment is to be considered as illustrative and not restrictive, and the invention is not to be limited to the details given herein, but may be modified within the scope and equivalents of the appended claims.

What is claimed is:

1. A method for analyzing process variations that occur during an integrated circuit fabrication process comprising:
   collecting critical dimension data for each layer of the integrated circuit fabrication process for a period of time;
   calculating a shift indicator that is indicative of variation in the critical dimension data for each layer of the integrated circuit fabrication process;
   calculating a machine drift significance indicator for each machine used in each layer of the integrated circuit fabrication process;
   defining a maximum shift of mean value for each layer of the integrated circuit fabrication process; and
   utilizing the shift indicator, the maximum shift of mean value and the machine drift significance indicator to determine at least one likely cause of variation in critical dimension for each layer of the integrated circuit fabrication process.

2. The method of claim 1, wherein the maximum shift of mean value is a function of a defined acceptable value of the shift indicator.

3. The method of claim 2 wherein the maximum shift of mean value is defined by the following formula:

Maximum shift of mean value=½ specification of the process−(target Cpk*3 standard deviation).

4. The method of claim 1, wherein the shift indicator is Cpk.

5. The method of claim 4, wherein Cpk is defined by the following formula:

Cpk=(½ specification of the process−mean value shift)/(3 standard deviation).

6. The method of claim 1, wherein the machine drift significance indicator is $P_0$.

7. The method of claim 8, wherein $P_0$ is defined by the following formula:

$$P_0 = \text{Probability}\left[x_{k-1}^2 = \frac{H}{1 - \sum_{j=1}^{t} q_j(q_j^2 - 1)/n(n^2 - 1)}\right].$$

8. A method for analyzing process variations that occur during an integrated circuit fabrication process comprising:
   collecting critical dimension data for each layer of the integrated circuit fabrication process for a period of time;
   calculating a shift indicator that is indicative of variation in the critical dimension data for each layer of the integrated circuit fabrication process;
   determining whether the shift indicator is less than about a predetermined first threshold value;
   determining whether a machine drift significance indicator calculated for each machine used in each layer of the integrated circuit fabrication process is greater than about a second predetermined threshold value when the shift indicator is less than about the first predetermined threshold value; and
   identifying at least one likely cause of variation in critical dimension for each layer of the integrated circuit fabrication process based at least in part upon the determination of whether the machine drift significance indicator is greater than about the second predetermined threshold value.

9. The method of claim 8, wherein the first predetermined threshold value is about 1.33.

10. The method of claim 8, wherein the second predetermined threshold value is between about 0.05 and 0.10.

11. The method of claim 10, wherein the second predetermined threshold value is about 0.05.

12. The method of claim 8, wherein the likely cause of variation in critical dimension is one of process variations and machine drift of the machine associated with the machine drift significance indicator.

13. The method of claim 8, wherein when the machine drift significance indicator is greater than about the second predetermined threshold value, the method further comprises:
   calculating a maximum shift in mean value for each machine used in each layer of the integrated circuit fabrication process, and determining whether the maximum shift in mean value is less than about a third predetermined threshold value; and identifying a particular machine as the likely cause of variation in critical dimension when the maximum shift in mean value is greater than about the third predetermined threshold value.

14. The method of claim 13, wherein the third predetermined threshold value is about 0 $\mu$m.

15. The method of claim 13, wherein the particular machine is one selected from the group consisting of a photolithography machine, an etch machine and a SEM machine.

16. The method of claim 15, further comprising:
adjusting the focus and exposure of the photolithography machine to correct the variation in critical dimension.

17. The method of claim 8, wherein when the machine drift significance indicator is less than about the second predetermined threshold value, the method further comprises:

calculating a maximum shift in mean value for each machine used in each layer of the integrated circuit fabrication process, and determining whether the maximum shift in mean value is less than about a third predetermined threshold value; and identifying a particular process as the likely cause of variation in critical dimension when the maximum shift in mean value is less than about the third predetermined threshold value.

18. The method of claim 17, wherein the machine is one selected from the group consisting of a photolithography machine, an etch machine and a SEM machine.

19. The method of claim 17, wherein the third predetermined threshold value is about 0 $\mu$m.

20. The method of claim 8, wherein when the machine drift significance indicator is less than about the second predetermined threshold value, the method further comprises:

calculating a maximum shift in mean value for each machine used in each layer of the integrated circuit fabrication process, and determining whether the maximum shift in mean value is between about a third predetermined threshold value and about a fourth predetermined threshold value; and identifying a particular process or the machine used in the particular process as the likely cause of variation in critical dimension when the maximum shift in mean value is between about a third predetermined threshold value and about a fourth predetermined threshold value.

21. The method of claim 20, wherein the third predetermined threshold value is about 0.00 $\mu$m and the fourth predetermined threshold value is about 0.02 $\mu$m.

22. The method of claim 20 further comprising:
testing a photolithography machine used in a photolithography process to determine whether the photolithography machine is the cause of variation in critical dimension.

23. The method of claim 8, wherein when the machine drift significance indicator is less than about the second predetermined threshold value, the method further comprises:

calculating a maximum shift in mean value for each machine used in each layer of the integrated circuit fabrication process and determining whether the maximum shift in mean value is greater than about a third predetermined threshold value; and identifying a particular machine as the likely cause of variation in critical dimension data when the maximum shift in mean value is greater than about the third predetermined threshold value.

24. The method of claim 23, wherein the third predetermined threshold value is about 0.02 $\mu$m.

25. The method of claim 23 further comprising:
adjusting the focus and exposure of a photolithography machine used in a photolithography process to correct the variation in critical dimension.

26. A method for analyzing process variations that occur during an integrated circuit fabrication process comprising:

collecting critical dimension data for each layer of the integrated circuit fabrication process for a period of time;

calculating a shift indicator each layer that is indicative of variation in critical dimension for each layer of the integrated circuit fabrication process;

determining whether the shift indicator is greater than about a first predetermined threshold value;

calculating a maximum shift in mean value for each machine used in each layer of the integrated circuit fabrication process and determining whether the maximum shift in mean value is less than about a second predetermined threshold value when the shift indicator is greater than about the first predetermined threshold value; and identifying a particular machine as the likely cause of variation in critical dimension when it is determined that the maximum shift in mean value is greater than about the second predetermined threshold value.

* * * * *